US005445503A

United States Patent [19]

Kmiec et al.

[11] Patent Number: 5,445,503

[45] Date of Patent: Aug. 29, 1995

[54] FUEL PUMP MOUNTING BRACKET

[75] Inventors: Timothy M. Kmiec, Rochester Hills; Joseph J. Melotik, White Lake; Glenn P. Vangelderen, West Bloomfield, all of Mich.

[73] Assignee: Ford Motor Company, Dearborn, Mich.

[21] Appl. No.: 130,829

[22] Filed: Oct. 4, 1993

[51] Int. Cl.[6] .......................... F04B 35/04; F16M 13/00

[52] U.S. Cl. .......................... 417/360; 417/363; 248/674

[58] Field of Search .......................... 417/360, 363; 248/674

[56] References Cited

U.S. PATENT DOCUMENTS

| | | | |
|---|---|---|---|
| 2,541,828 | 2/1951 | Peck | 248/300 X |
| 4,455,011 | 6/1984 | Levine | 248/674 X |
| 4,467,486 | 8/1984 | Schatz | 248/300 X |
| 4,651,701 | 3/1987 | Weaver | 417/363 X |
| 4,694,857 | 9/1987 | Harris | 417/363 X |
| 4,780,063 | 10/1988 | Tuckey | 417/363 X |
| 4,861,238 | 8/1989 | Kamiyama et al. | 417/363 |

*Primary Examiner*—Richard E. Gluck
*Attorney, Agent, or Firm*—David B. Kelley; Roger L. May

[57] ABSTRACT

A fuel pump is mounted within the fuel tank of an automobile on a bracket attached to a flange which sealingly covers an opening in the fuel tank. The bracket has side members with materially altered sections for increasing the energy absorption capability of the bracket. Materially altered sections can take the shape of oblong slots or circular apertures in a center section of the side members, or notches along the edges of the side members. Crimped sections in the side members also serve to absorb energy imparted to the bracket.

8 Claims, 2 Drawing Sheets

FUEL PUMP MOUNTING BRACKET

FIELD OF THE INVENTION

This invention relates to automotive fuel pump, and, more particularly, to an energy absorbing bracket assembly for mounting an automotive fuel pump within a fuel tank.

BACKGROUND OF THE INVENTION

It is well known to mount a fuel pump within an automobile fuel tank. Typically for in-tank mounted fuel pumps, the fuel tank has an opening for access to the fuel pump. A flange plate covers the opening and has fittings for the fuel line, the fuel return line, and electrical connections leading to the fuel pump. The fuel pump is supported within the fuel tank by a bracket or other rigid member attached to the flange plate. For example, U.S. Pat. No. 5,165,867 (Dockery) discloses such a mounting for an electric fuel pump on a rigid metal return fuel conduit including a plastic support with a center body and a pair of integral flexible arms for clamping the fuel pump to the center body. The rigid metal return fuel conduit may not, however, adequately absorb energy imparted to it from a load originating from the bottom of the fuel tank. As a result, the energy from a bottom load may be transferred to the flange plate perhaps causing it to become misaligned with the top of the fuel tank.

SUMMARY OF THE INVENTION

The present invention provides a fuel pump mounting apparatus for more adequately absorbing energy and for mounting a fuel pump within a fuel tank of an automobile having a top and a bottom. A flange sealably covers an opening in the top of the fuel tank with a bracket fixably attached to the flange and to the fuel pump. The bracket has at least one side with a plurality of structurally altered sections positioned on the at least one side such that the bracket absorbs energy from a load, which may originate from the bottom of the tank, to prevent the energy from transferring to the flange so that the flange remains co-planar with the top of the tank.

In a first preferred embodiment, the structurally altered sections comprise oblong slots in the at least one side with elongated ends aligned parallel to a vertical axis between the top and bottom of the fuel tank.

Other preferred embodiments have a bracket with at least one side member having a pair of edges parallel to a vertical axis between the top and the bottom of the fuel tank. In a second preferred embodiment, the structurally altered sections comprise at least one circular aperture in each of the side members. In a third preferred embodiment, the edges of the side members have at least one notch, preferably a semi-circular shaped notch. In a fourth preferred embodiment, the structurally altered sections comprise at least one crimped section in the at least one side of the bracket having a first bend which angles from a plane along an axis extending from the tank top to the tank bottom, and a second bend which angles in an opposite direction to connect with the at least one side. Preferably, this fourth embodiment has a plurality of oppositely angled bends interposed between the first bend and the second bend.

Thus, an object of the present invention is to provide a fuel pump mounting apparatus having structurally altered sections capable of absorbing energy from a bottom load to more easily maintain a flange cover plate in alignment with the top of the fuel tank.

DETAILED DESCRIPTION OF THE PREFERRED EMBODIMENTS

Figure 1:
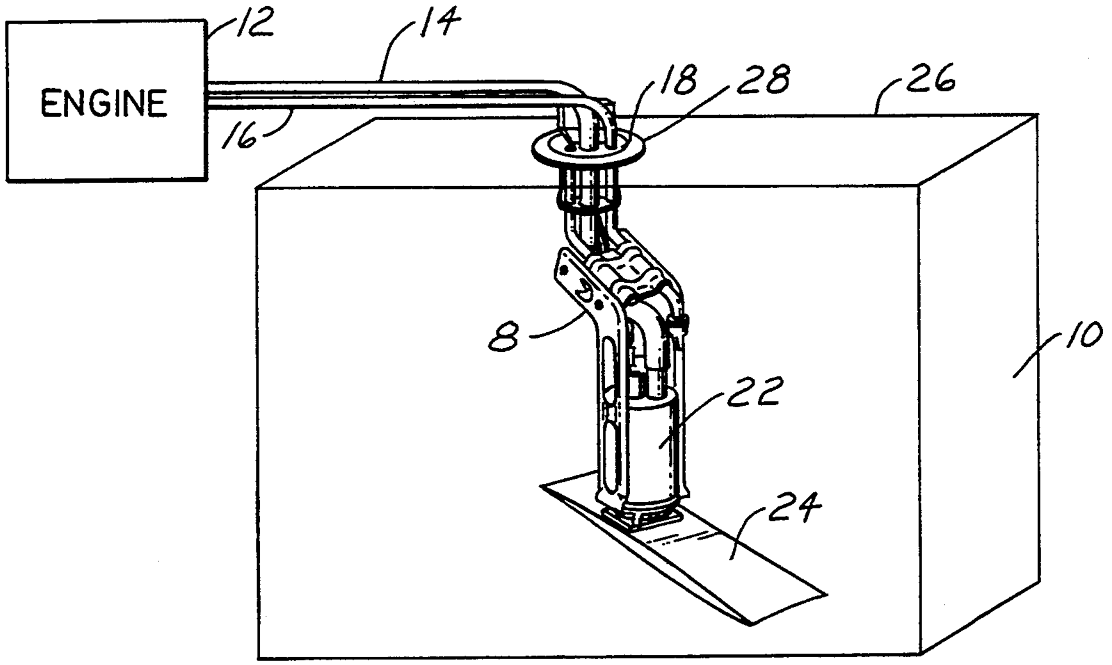
FIG. 1 is a schematic view of a fuel pump mounting apparatus according to the present invention mounted within a fuel tank.

Referring now to FIG. 1, a fuel pump assembly 8 is mounted within a fuel tank 10 of an automobile (not shown) through an opening 28 in fuel tank top 26. Fuel pump assembly 8 consists of a flange plate 18 to which bracket 20 is fixably attached, fuel pump 22 fastened to bracket 20, and fuel filter 24 secured to the inlet portion of fuel pump 22. Flange plate 18 fits into an opening 28 and sealably mates with tank top 26. Fuel line 14 carries fuel from pump 22 to engine 12, while return line 16 returns fuel from engine 12 to fuel tank 10.

Figure 2:
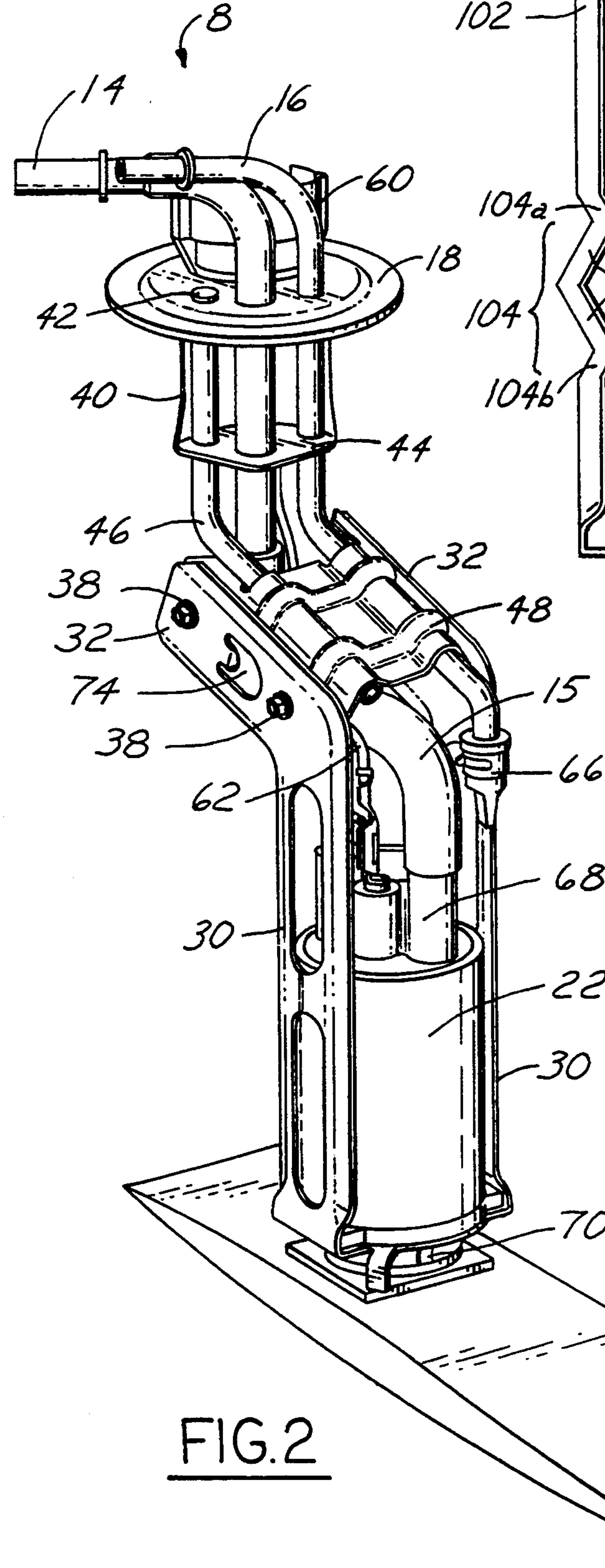
FIG. 2 is a perspective view of the fuel pump mounting apparatus of the present invention showing a fuel pump mounted within.

Fuel pump assembly 8 is shown in more detail in FIG. 2. Fuel line 14 and return line 16 pass through flange plate 18 to base 44 of guide 40. Support rod 46, which runs parallel to fuel line 14 and return line 16, has head 42 welded to flange plate 18 and also runs through base 44 of guide 40. Guide 40 is attached, preferably by welding, to flange plate 18 and provides direction and support for fuel line 14, return line 16, and support rod 46. Fuel line 14, return line 16, and support rod 46 are affixed to flange plate 18 and guide base 44 preferably by welding or soldering, and preferably are made of stainless steel or corrosion resistant coated steel. Return line 16 and support rod 46 bend toward and run under bracket separator 48 to which they are attached preferably by welding. Fuel return line 16 extends beyond bracket separator 48 and bends toward fuel tank bottom 27 (FIG. 1) where it terminates into rollover valve 66. In addition to guiding support rod 46 and return line 16, bracket separator 48 serves to connect and stabilize side members 30 of bracket 20. Bracket screws 38 connect upper portion 32 of side member 30 to bracket separator 48, and upper slot tabs 76 (FIG. 3) of bracket upper portion 32 connect to bracket connector sides 74.

Fuel line 14 has a section 15, preferably made of any flexible material, such as rubber, which passes beneath bracket separator 48 and attaches to connector 68 on a portion of fuel pump 22 nearest tank top 26.

An electrical plug 60 is mounted on top of flange plate 18 for connection with an electrical source (not shown) to provide electrical power to fuel pump 22. Electrical wire 62 connects electrical plug 60 to pump terminal 64.

Figure 3:
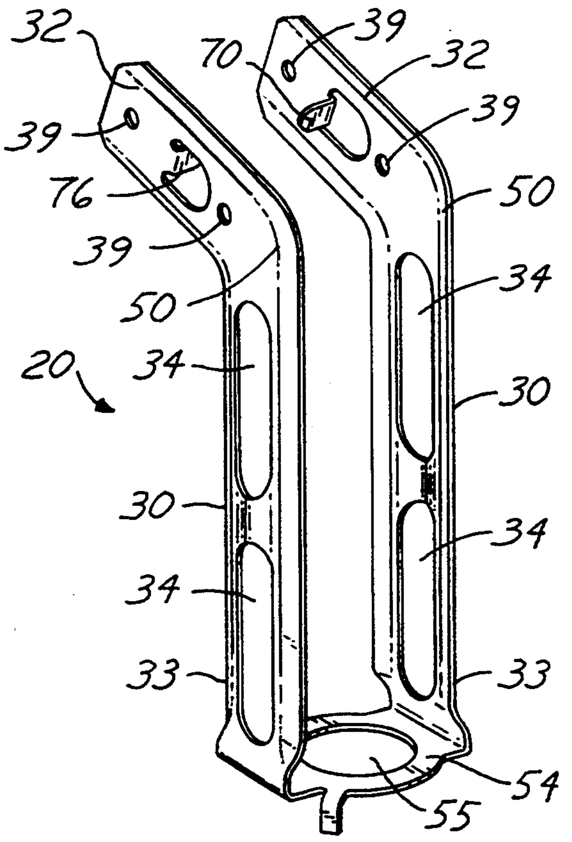
FIG. 3 is a perspective view of the fuel pump mounting apparatus of the present invention having oblong slots in the side members.

FIG. 3 shows a first preferred embodiment of the present invention. Bracket 20 has a pair of side members 30 attached by a bracket base 54. Pump 22 rests on bracket base 54 with filter connector 70 (FIG. 2) fitted through bracket base hole 55 as an attachment to fuel filter 24. Each side member 30 has an upper portion 32, a lower vertically oriented portion 33, and a bracket bend 50 between upper portion 32 and lower portion 33. Bracket screw holes 39 are drilled in upper portion 32 to receive bracket screws 38 for connection to bracket separator 48 as previously discussed.

It is believed that removal of material from the cross-section of a structural support member, such as side members 30 of bracket 20, increases the energy absorption capability of that support member by allowing it to more easily deform upon application of a load. The load required to bend a structural support member is given by the following equation:

bending load=yield strength*width*gauge where bending load=the load needed to bend the structure;

yield strength=the compressive pressure at which the material of the support structure will bend;

width=the structure width in a direction perpendicular to an axis of the direction of the bending force; and gauge=the thickness of the support structure.

As shown by the foregoing equation, a decrease in the effective width of the structure results in a decreased bending force required for deformation, and thus an increased ability to absorb energy from a bottom load.

As shown in FIG. 3, slots 34 in lower portions 33 reduce the effective width of bracket 20. Bracket 20 can thus better absorb energy from a load originating generally from the direction of tank bottom 27 so as to prevent that energy from being transferred to flange 18. Flange 18 will thus remain co-planar with tank top 26. Slots 34 preferably are oblong in shape with elongated ends aligned parallel to a vertical axis between tank top 26 and tank bottom 27.

Figure 4:
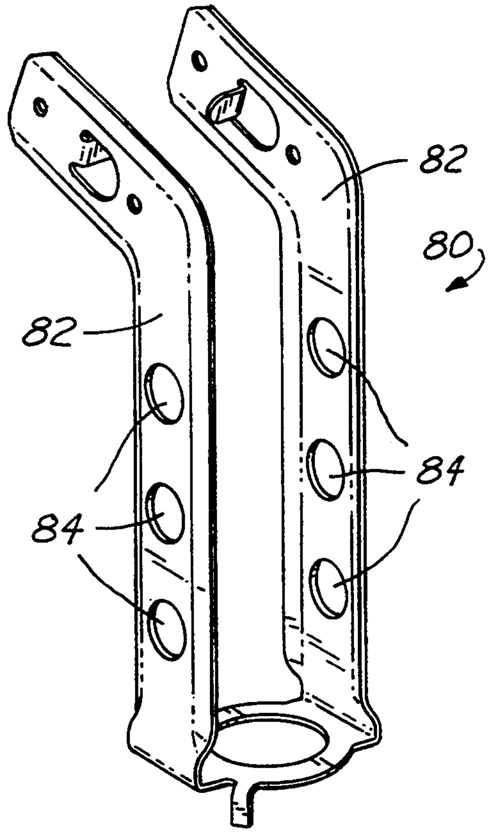
FIG. 4 is a perspective view of an alternative embodiment of the fuel pump mounting apparatus of the present invention having circular apertures in the side members.

A second preferred embodiment is shown in FIG. 4. Bracket 80 has structurally altered sections with removed material in the form of circular apertures 84. The particular embodiment shown has a set of three circular apertures 84 on each side member 82 arranged along a vertical axis between tank top 26 and tank bottom 27.

Figure 5:
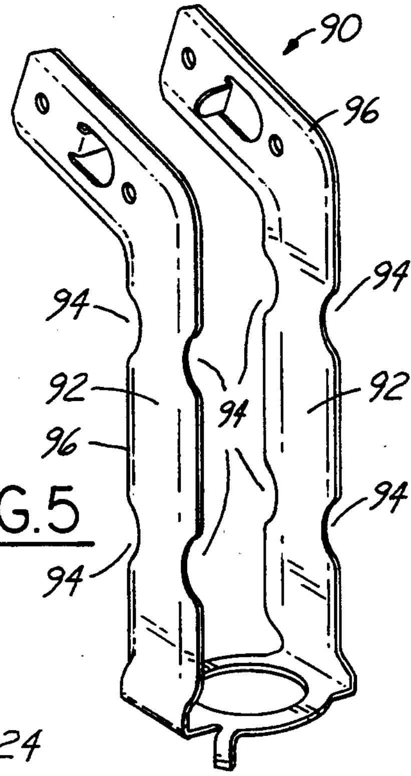
FIG. 5 is a side view of an alternative embodiment of the fuel pump mounting apparatus of the present invention having notches in the side members.

FIG. 5 shows a third preferred embodiment of the present invention in which bracket 90 has side members 92 with notches 94 as the structurally altered sections in edges 96. The notches 94 preferably have a semi-circular shape. Such notches 94 decrease the cross-section through which a bottom load acts, as discussed above. Thus, the bending force required to deform bracket 90 is less than if side members 92 had no notches 94. However, such a design is less desirable than those in which material is removed from the center of the support structure, as shown in FIGS. 3 and 4, for noise, vibration, and harshness (NVH) considerations.

Notches 94, apertures 84, and slots 34 can be machined into brackets 90, 80, and 30, respectively, or can be integrally molded in a manner known to those skilled in the art and suggested by this disclosure.

Figure 6:
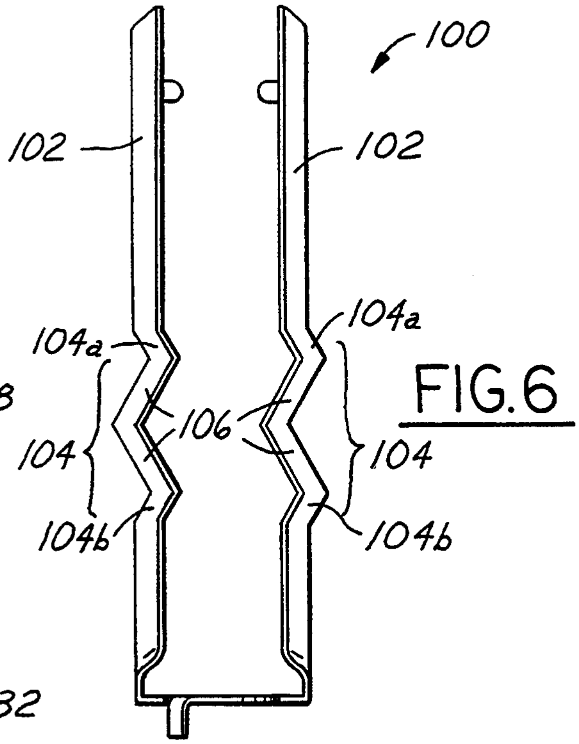
FIG. 6 is a side view of an alternative embodiment of the fuel pump mounting apparatus of the present invention having crimped sections in the side members.

Structurally altered sections can also accomplish energy absorption from a bottom load without material removal from the bracket side members 30. FIG. 6 is a side view of a fourth preferred embodiment of the present invention. Bracket 100 has side members 102 with structurally altered sections in the form of crimped sections 104 and 106. At least one crimped section 104 in side members 102 of bracket 100 is required for energy absorption. Crimped sections 104 have a first bend **104*a* which angles from the plane of side member 102, and a second bend 104*b* which angles in an opposite direction to reconnect with side members 102. There may be a plurality of oppositely angled bends 106, as shown in FIG. 6, interposed between first bend 104*a* and said second bend 104*b*. Upon bottom loading, sections 104 and bends 106 will absorb energy by deforming thus allowing flange 18 to remain co-planar with tank top 26. Crimped sections 104 and bends 106 can be molded into bracket 100 or can be stamped into bracket 100**.

Although the preferred embodiments of the present invention have been disclosed, various changes and modifications may be made without departing from the scope of the invention as set forth in the appended claims.

We claim:

1. A fuel pump mounting apparatus for mounting a fuel pump within a fuel tank of an automobile having a top and a bottom, comprising:

a flange sealably covering an opening in the top of said fuel tank; and a bracket fixably attached to said flange and to said fuel pump, said bracket having at least one side member with at least one oblong slot having elongated ends aligned parallel to a vertical axis between said top and said bottom, said at least one slot positioned on said at least one side member such that said bracket absorbs energy from a load, said load generally originating from said bottom of said tank toward said top of said tank, to prevent said energy from transferring to said flange so that said flange remains co-planar with said top of said tank.

2. A fuel pump mounting apparatus according to claim 1, wherein said bracket has a pair of side members with at least one oblong slot on each of said side members.

3. A fuel pump mounting apparatus according to claim 2, wherein said pair of side members each have a pair of oblong slots thereon, said slots having elongated ends aligned parallel to a vertical axis between said top and said bottom.

4. A fuel pump mounting apparatus according to claim 3, wherein said side members have an upper portion connected to a bracket separator, a vertically oriented lower portion having said oblong slots therein, and a bracket bend connecting said upper portion and said lower portion such that said upper portion is at an angle to said lower portion.

5. A fuel pump mounting apparatus for mounting a fuel pump within a fuel tank of an automobile having a top and a bottom, comprising:

a flange sealably covering an opening in the top of said fuel tank; and a bracket fixably attached to said flange and to said fuel pump, said bracket having a pair of sides with a plurality of oblong slots with elongated ends aligned parallel to a vertical axis between said top and said bottom, said slots positioned on said pair of sides such that said bracket absorbs energy from a load, said load generally originating from said bottom of said tank toward said top of said tank, to prevent said energy from transferring to said flange so that said flange remains co-planar with said top of said tank.

6. A fuel pump mounting apparatus according to claim 5, wherein said pair of sides each have a pair of oblong slots thereon.

7. A fuel pump mounting apparatus according to claim 6, wherein said sides have an upper portion connected to a bracket separator, a vertically oriented lower portion having said oblong slots therein, and a bracket bend connecting said upper portion and said lower portion such that said upper portion is at an angle to said lower portion.

8. A fuel pump mounting apparatus for mounting a fuel pump within a fuel tank of an automobile having a top and a bottom, comprising:

a flange sealably covering an opening in the top of said fuel tank; and a bracket fixably attached to said flange and to said fuel pump, said bracket having a pair of side members with a plurality of oblong slots with elongated ends aligned parallel to a vertical axis between said top and said bottom, said side members have an upper portion connected to a bracket separator, a vertically oriented lower portion having said oblong slots therein, and a bracket bend connecting said upper portion and said lower portion such that said upper portion is at an angle to said lower portion, said slots positioned on said pair of side members such that said bracket absorbs energy from a load, said load generally originating from said bottom of said tank toward said top of said tank, to prevent said energy from transferring to said flange so that said flange remains co-planar with said top of said tank.

* * * * *